United States Patent Office 3,169,397
Patented Feb. 16, 1965

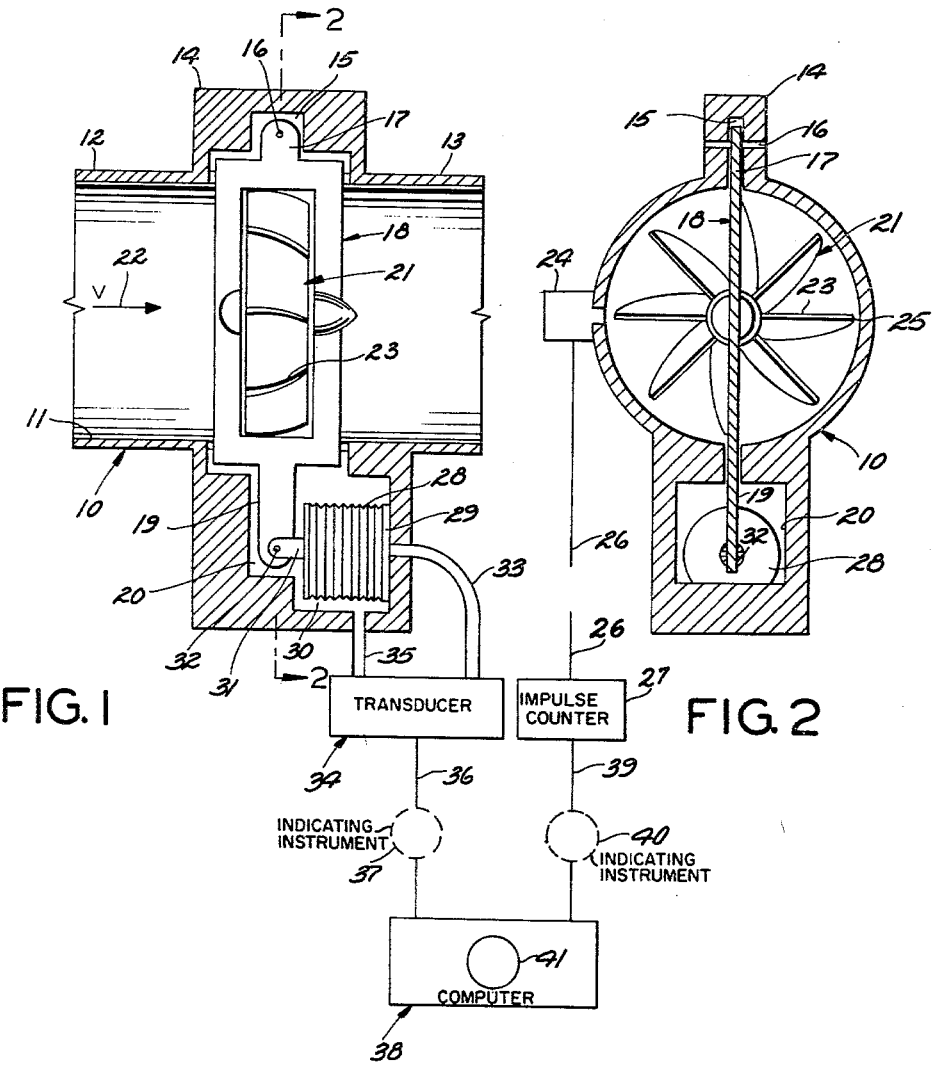

3,169,397
FLUID FLOW METER
William Bruce Murray, 4523 Fairway Drive, Lakewood, Long Beach, Calif.
Filed Nov. 30, 1961, Ser. No. 155,922
8 Claims. (Cl. 73—231)

This invention relates to measuring instruments and more particularly to a fluid flow meter for indicating the weight of fluid flowing through a conduit in a given interval of time.

Numerous types of fluid flow meters have heretofore been proposed and utilized, but many of these instruments are relatively complex and costly and furthermore, certain of these prior art instruments are limited to specialized uses. While the primary consideration in the design of a fluid flow meter has long been known, it obviously being desirable that the meter be highly accurate, that no substantial reduction in flow or a substantial pressure drop occur and also that the instrument be relatively simple and inexpensive, but the difficulties of attaining these desirable characteristics are quite considerable and while to a certain extent, the problem has been solved by the design of many different types of meters for different specific purposes, nevertheless, this does not represent an entirely practical and satisfactory solution to the problem.

It is accordingly an object of the invention to provide a fluid flow meter which is relatively simple in construction and which may be conveniently installed in a conduit or other means through which fluid flows and which serves to provide an accurate indication of the fluid flow through such conduit.

A further object of the invention is the provision of a fluid flow meter which operates to provide an accurate indication of the weight of fluid flowing through a passage or conduit in a given interval of time.

A still further object of the invention is the provision of a fluid flow meter which may be conveniently installed in a conduit or other passage for conducting fluid and which serves to provide an accurate indication of the flow of fluid through such conduit or passage while maintaining pressure drop or reduction of flow to a minimum.

Another object of the invention is the provision of a fluid flow meter in which the course of the moving fluid impinging on an object, as well as the velocity of the fluid is utilized to provide an accurate indication of the fluid flow.

A further object of the invention is the provision of a fluid flow meter which may be conveniently installed in a conduit or passage through which fluid flows and in which visual indicating means for indicating the flow of fluid may be installed at a point remote from the installation of the meter in the conduit or passage.

A still further object of the invention is the provision of a fluid flow meter which may be conveniently and economically constructed from readily available materials and which may be installed in a conduit or passage with a minimum of effort.

Further objects and advantages of the invention will be apparent from the following description taken in conjunction with the accompanying drawing wherein:

FIG. 1 is a longitudinal sectional view showing a fluid flow meter constructed in accordance with this invention and with a portion of the indicating circuit diagrammatically shown; and FIG. 2 a sectional view taken substantially on the line 2—2 of FIG. 1 and showing diagrammatically a further portion of the indicating circuit.

With continued reference to the drawing, there is shown a fluid flow meter constructed in accordance with this invention and which may well comprise a body 10 having a passage 11 therethrough for the flow of fluid to be measured. The body 10 may be provided with axially extending tubular portions 12 and 13 which serve to facilitate installation of the body 10 in a conduit or other means through which fluid flows and in most installations, it would only be necessary to remove a relatively short section of conduit and substitute the body 10 therefor, the passage 11 thereafter providing a continuation of the passage through the conduit.

The body 10 may be provided intermediate the length thereof with an enlarged portion 14 and within a recess 15 in the enlarged portion 14 there may be provided a pivotal mounting 16 for one end 17 of a yoke 18 which extends entirely across the passage 11 in the body 10 with the opposite end 19 of the yoke 18 being disposed in a chamber 20 in the enlarged portion 14, the chamber 20 communicating with the passage 11 in the body 10. A turbine wheel 21 is mounted in the yoke 18 for free rotation and such rotation of the turbine wheel 21 results from impinging of the fluid flowing through the passage 11 in the direction of the arrow 22 on the blade 23 of the turbine wheel 21. Suitable anti-friction bearings are employed for mounting the turbine wheel 21 in the yoke 18 in order that rotation of the wheel 21 will not be impeded and the same will rotate at a speed directly proportional to the velocity of the fluid flowing through the passage 11.

A reluctance type magnetic pickup 24 or other device capable of performing a similar function is mounted on the enlarged portion 14 of the body 10 adjacent the tips 25 of the blades 23 of the turbine wheel 21 and the pickup 24 is connected through a suitable conductor 26 to an impulse counter 27, the purpose and operation of which will be presently described.

Disposed in the chamber 20 of the enlarged portion 14 of the body 10 is a closed bellows 28 of conventional construction, one end 29 of the bellows being secured to the body 10 and the opposite end 30 being provided with a stud 31 which is pivotally connected at 32 to the end 19 of the yoke 18. The bellows 28 is filled with an incompressible fluid and such bellows is connected through a suitable conduit 33 with a differential pressure transducer 34. The transducer 34 is also connected by a suitable conduit 35 with the chamber 20 in the body 10, this connection providing a reference pressure to the transducer 34 which is substantially the pressure of the fluid flowing through the passage 11 which, as stated above, communicates with the chamber 20. The transducer 34 may be connected through a suitable conductor 36 and an indicating instrument 37 with a suitable computer 38 and in a similar manner, the counter 27 may be connected through a suitable conductor 39 and a suitable indicating instrument 40 with the computer 38. The computer 38 may be provided with a visual indicator 41 which may be calibrated in a manner to provide a visual indication of the weight of fluid flowing through the passage 11 in a given interval of time.

In operation, fluid flowing through the passage 11 in the direction of the arrow 22 impinges on the blades 23 of the of the turbine wheel 21 and causes the same to rotate at a speed proportional to the velocity of the fluid flowing in the passage 11. Movement of the tips 25 of the blades 23 by the magnetic pickup 24 results in the generation of sharp pulses which serve to energize the counter 27 in a manner to indicate the speed of rotation of the turbine wheel 21 and the counter 27 provides an electrical output proportional to such speed of rotation which is supplied to the computer 38. At the same time, the force exerted by the fluid impinging on the turbine wheel 21 and the yoke 18 results in a tendency to displace the yoke 18 counterclockwise about the pivot 16 as shown in FIG. 1, which movement, of course, is counteracted by the bellows 28 which results in the generation of a pressure in the bellows 28 which is transmitted by the incompressible fluid therein through the conduit 33 to the differential transducer 34. In the transducer 34, the pressure applied thereto through the conduit 33 is compared with the reference pressure supplied through the conduit 35, the resulting output of the transducer 34 being in the form of an electrical output proportional to the force exerted by the fluid flowing through the passage 11 impinging on the turbine wheel 21 and yoke 18. This electrical output from the transducer 34 is supplied to the computer 38 which operates to compare this information with that received from the counter 27, the result being indicated on the instrument 41, which as stated above, is calibrated in terms of weight of fluid flowing through the passage 11 in a given time interval.

Obviously, the indicating instrument 41 can be disposed at any desired location, either directly on the computer 38 or at a point remote therefrom and also the indicating instruments 37 and 40 may if desired, be omitted, since these merely serve to provide a visual indication of the electrical output from the transducer 34 and the counter 27 respectively.

The above described flow meter is relatively simple and economical to construct and obviously will permit fluid flow through a passage without materially reducing the rate of flow or pressure therein, since the turbine wheel 21 freely rotates and offers little resistance to the flow of fluid and furthermore, since the material of the yoke 18 may be made relatively thin there is little resistance to the flow of fluid provided by this structure. The necessary electrical components, such as the magnetic pickup 24, the counter 27, the differential pressure transducer 34 and the computer 38 are commercial items which are readily available and incorporated in a system, such as that described above results in providing an extremely accurate indication of fluid flow through a conduit or other passage.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A fluid flow meter comprising a body having a passage therethrough for flow of fluid to be measured, a yoke extending across said passage and pivotally mounted at one end on said body for pivotal movement axially of said passage, a turbine wheel mounted in said yoke for free rotation by fluid flowing through said passage, a magnetic pickup on said body adjacent the tips of the blades of said wheel, said body having a chamber communicating with said passage, a closed bellows mounted in said chamber, force-transmitting means pivotally connecting said bellows and the opposite end of said yoke, said bellows being filled with an incompressible fluid, a differential pressure transducer, a conduit connecting said bellows and said transducer, a conduit connecting said chamber and said transducer, whereby said transducer provides an electrical output proportional to the displacement of said yoke by fluid flowing through said passage and impinging on said wheel and yoke, an impulse counter connected to said pickup, said counter providing an electrical output proportional to the speed of rotation of said wheel and means for comparing the electrical output of said transducer and said counter to provide an indication of the weight of fluid flowing through said passage.

2. A fluid flow meter comprising a body having a passage therethrough for flow of fluid to be measured, a yoke extending across said passage and pivotally mounted at one end on said body for pivotal movement axially of said passage, a turbine wheel mounted in said yoke for free rotation by fluid flowing through said passage, a magnetic pickup on said body adjacent the tips of the blades of said wheel, said body having a chamber communicating with said passage, a closed bellows mounted in said chamber, force-transmitting means connecting said bellows and the opposite end of said yoke, a differential pressure transducer, a conduit connecting said bellows and said transducer, a conduit connecting said chamber and said transducer, whereby said transducer provides an electrical output proportional to the displacement of said yoke by fluid flowing through said passage and impinging on said wheel and yoke, an impulse counter connected to said pickup, said counter providing an electrical output proportional to the speed of rotation of said wheel and means for comparing the electrical outputs of said transducer and said counter to provide an indication of the weight of fluid flowing through said passage.

3. A fluid flow meter comprising a body having a passage therethrough for flow of fluid to be measured, a yoke extending across said passage and pivotally mounted at one end on said body for pivotal movement axially of said passage, a turbine wheel mounted in said yoke for free rotation by fluid flowing through said passage, a magnetic pickup on said body adjacent the tips of the blades of said wheel, a closed bellows mounted on said body, force-transmitting means connecting said bellows and the opposite end of said yoke, a differential pressure transducer, a conduit connecting said bellows and said transducer, a conduit connecting said passage and said transducer, whereby said transducer provides an electrical output proportional to the displacement of said yoke by fluid flowing through said passage and impinging on said wheel and yoke, an impulse counter connected to said pickup, said counter providing an electrical output proportional to the speed of rotation of said wheel and means for comparing the electrical outputs of said transducer and said counter to provide an indication of the weight of fluid flowing through said passage.

4. A fluid flow meter comprising a body having a passage therethrough for flow of fluid to be measured, a yoke extending across said passage and pivotally mounted at one end on said body for pivotal movement axially of said passage, a turbine wheel mounted in said yoke for free rotation by fluid flowing through said passage, a closed bellows mounted on said body, force-transmitting means connecting said bellows and the opposite end of said yoke, a differential pressure transducer, a conduit connecting said bellows and said transducer, a conduit connecting said passage and said transducer, whereby said transducer provides an electrical output proportional to the displacement of said yoke by fluid flowing through said passage and impinging on said wheel and yoke, means for measuring the speed of rotation of said wheel and for providing an electrical output proportional to such speed of rotation and means for comparing the electrical outputs of said transducer and said speed measuring means to provide an indication of the weight of fluid flowing through said passage.

5. A fluid flow meter comprising a body having a passage therethrough for flow of fluid to be measured, a yoke extending across said passage and pivotally mounted at a first end thereof on said body for pivotal movement axially of said passage, a turbine wheel mounted in said yoke for free rotation by fluid flowing through said passage, first means pivotally connected to a second end of said yoke for measuring the force on said yoke as said yoke is pivoted relative to said body by fluid flowing through said passage and impinging on said wheel and yoke, second means responsive to said force as measured by said first means for providing an electrical output proportional thereto, third means for measuring the speed of rotation of said wheel and to provide an electrical output proportional to the speed of said wheel, and fourth means for comparing the electrical output of said second and third means to provide an indication of the weight of fluid flowing through said passage.

6. A fluid flow meter as defined in claim 5 wherein said second means includes a bellows.

7. A fluid flow meter as defined in claim 5 wherein said second means includes an elastically deformable element.

8. A fluid flow meter as defined in claim 5 wherein said second means includes at least one element that moves in response to said force as measured by said first means.

References Cited by the Examiner
UNITED STATES PATENTS

| | | | |
|---|---|---|---|
| 1,425,936 | 8/22 | Bailey | 73—231 |
| 2,772,567 | 12/56 | Boden et al. | 73—194 |
| 2,804,771 | 9/57 | Brown | 73—228 |
| 2,975,635 | 3/61 | Kindler et al. | 73—228 |
| 3,064,475 | 11/62 | Gilbert | 73—231 |

RICHARD C. QUEISSER, *Primary Examiner.*
ROBERT EVANS, *Examiner.*